Figure 1:
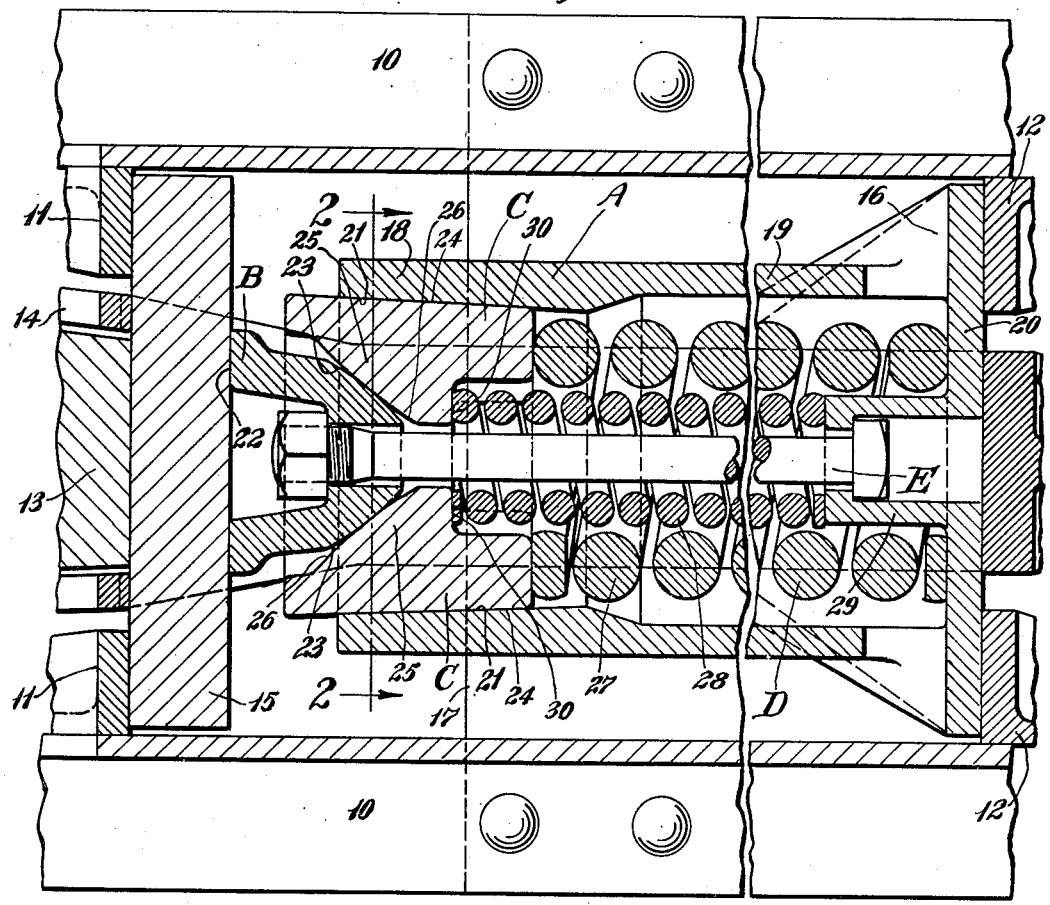

Sept. 5, 1939.  E. H. LEHMAN  2,171,659

FRICTION SHOCK ABSORBING MECHANISM AND PROCESS OF FITTING PARTS

Filed June 18, 1937

Inventor
Edward H. Lehman
By Henry Fuchs
Atty.

Patented Sept. 5, 1939

2,171,659

UNITED STATES PATENT OFFICE 2,171,659

FRICTION SHOCK ABSORBING MECHANISM AND PROCESS OF FITTING PARTS

Edward H. Lehman, Chicago, Ill., assignor to W. H. Miner, Inc., Chicago, Ill., a corporation of Delaware Application June 18, 1937, Serial No. 148,915

7 Claims. (Cl. 213—32)

This invention relates to improvements in friction shock absorbing mechanisms and process of fitting parts of mechanisms of this character. More particularly the invention relates to a mechanism of the character referred to wherein is employed a wedge friction system including wedging means and a plurality of friction shoes coacting with a friction column.

As is well known to those skilled in the art, in order to obtain the required high capacity together with efficient and reliable operation of friction shook absorbing mechanisms for railway draft riggings demanded by modern railway practice, it is important that the cooperating elements of the friction wedge system be accurately fitted to each other when operating in service, in other words, that they have true contact with each other on relatively large surface areas. It is well recognized that to resort to machine finishing operations in the manufacture of friction shock absorbing mechanisms is prohibitive due to the increased expense involved. In those shock absorbing mechanisms employing a friction casing, a plurality of friction shoes arranged within the casing, and a combined pressure transmitting and spreading member it is the usual practice to make the casing as a casting without any machine finishing operation, to make the pressure transmitting member as a casting or forging, and drop-forge the shoes, and in the case of the latter elements satisfactorily accurate results can be obtained. However, in the manufacture of the friction casing by casting, precise accuracy cannot always be obtained due to unavoidable foundry variations. In foundry operations certain working variations must be allowed for in commercial practice. Due to the necessary foundry variations which must be permitted in commercial practice in the manufacture of the friction casings, there is a lack of uniformity in the casings produced. Machining of the interior of the casings and especially the friction surfaces thereof is too difficult and expensive to receive practical consideration. It has for some time been the practice in this art, in order to produce an efficient mechanism to compensate for these inaccuracies in the casings by fitting the other parts of the gear to each individual casing by crowning one of the faces of each cooperating set of engaging faces of the pressure transmitting member and shoes to permit adjustment between these parts when the mechanism is initially assembled, and then flattening down said crowned faces by successive compressions of the mechanism.

One object of my invention is to provide a friction shock absorbing mechanism including friction shoes and wedge means forming a friction clutch cooperating with a column element, wherein the opposed engaging faces or surfaces of the wedge means and shoes are each crowned whereby adjustment of the parts of the friction shock absorbing mechanism with respect to each other, within the limits of variations necessitated by commercial manufacture of the casings can be had to positively insure the proper contact of all of the cooperating engaging sets of surfaces of the parts of the mechanism.

A more specific object of the invention is to provide in that type of friction shock absorbing mechanism comprising a friction casing having interior friction surfaces extending lengthwise of the casing, a plurality of friction shoes slidable on said friction surfaces, and a centrally disposed wedge block having wedge faces engaging the shoes, wherein the engaging surfaces of the wedge and shoes are all initially crowned and are adapted to be flattened out under pressure to produce substantial true surface contact between these faces of the wedge block and shoes and the cooperating friction surfaces of the shoes and casing regardless of variations which may occur in the inclination of the friction surfaces of the casing which are necessitated by commercial practice.

Still another object of the invention is to provide a process or method by which the wedge, shoes, and shell of a friction shock absorbing mechanism of the character specified in the preceding paragraph are accurately fitted to each other by providing crowned cooperating surfaces on the wedge and shoes which surfaces are flattened down through a few actuations of the mechanism after the parts have been assembled, whereby the permitted foundry variations encountered in commercial practice will be automatically compensated for.

Other objects of the invention will more clearly appear from the description and claims hereinafter following.

Figure 2:
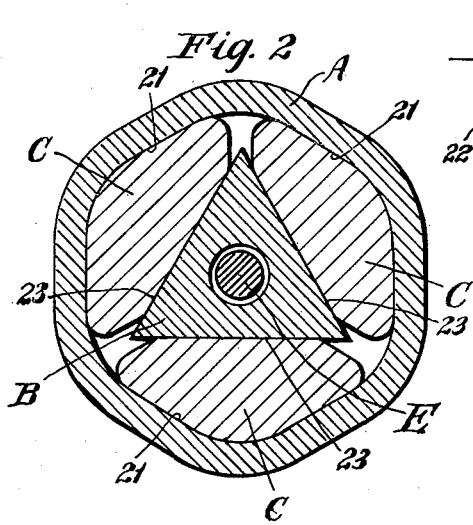
Figure 3:
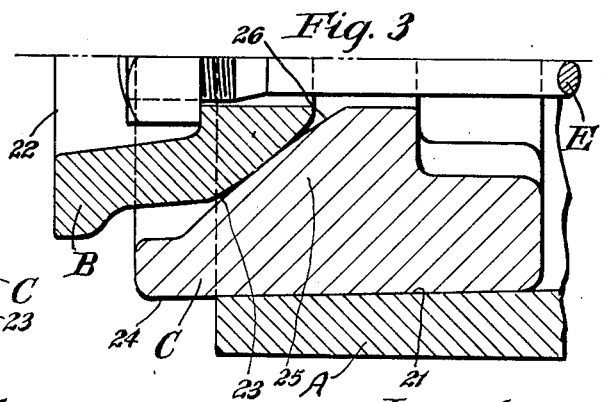

In the drawing forming a part of this specification, Figure 1 is a longitudinal sectional view of a portion of a railway draft rigging, illustrating my improvements in connection therewith, the section through the shell and friction elements therewithin corresponding to two section planes at 120° apart. Figure 2 is a transverse vertical sectional view, corresponding substantially to the line 2—2 of Figure 1. Figure 3 is a longitudinal sectional view on an enlarged scale, of a wedge, friction shoe, and portions of the friction casing.

In said drawing, 10—10 denote the usual draft or center sills of a car underframe structure, said sills being preferably of channel cross section and to the inner faces of which are secured front stop lugs 11—11 and rear stop lugs 12—12 of usual construction. The inner end portion of the drawbar is indicated at 13, the same being operatively connected to a hooded yoke 14 of well-known form and within which is disposed the shock absorbing mechanism proper hereinafter described and a front follower 15. The improved friction shock absorbing mechanism proper, illustrated in the drawing is of that type employing a substantially hexagonal casing having a rear follower portion 16 formed integral therewith. The casing is supported within the yoke and the yoke in turn is supported in operative position by a detachable saddle plate 17 fixed to the draft sills.

The improved shock absorbing mechanism proper, as shown, comprises a casing A; a pressure transmitting wedge B having slightly crowned wedge faces; three friction shoes C—C—C also having slightly crowned wedge faces; a spring resistance D; and a retainer bolt E.

The casing A is of substantially hexagonal exterior cross section having the friction shell portion proper 18 thereof formed at the open front end thereof. Rearwardly of the friction shell section, the casing A provides a spring cage portion 19. The casing is closed at the rear end by a transverse vertical wall 20 which extends laterally outwardly at opposite sides of the casing, thus providing flanges which form the spring follower section 16 cooperating with the rear stop lugs 12—12 in the manner of the usual rear follower. As shown clearly in Figures 1 and 2, the walls of the friction shell portion 18 of the casing are relatively thickened with respect to the rear sections of said wall. The friction shell section 18 of the casing is of hexagonal interior cross section and presents three interior friction surfaces 21—21—21 which are of V-shaped cross section, extend lengthwise of the casing, present substantially flat faces, and converge inwardly and rearwardly toward the central longitudinal axis of said casing. As will be evident, the converged friction surfaces 21—21—21 provide a friction shell portion which is tapered slightly toward the rear of the mechanism.

The wedge B through which the pressure is transmitted, is in the form of a hollow block having a front transverse bearing face 22 engaging the front follower 15. At its rear end, the wedge B is provided with three rearwardly converging, longitudinally convex or crowned wedge faces 23—23—23 disposed around the center or axis of the wedge and giving the wedge the appearance of a truncated triangular pyramid.

The three friction shoes C—C—C are preferably in the form of drop-forgings and are of like construction, each having an outer V-shaped friction surface 24, the sections of which are in flat face engagement with the corresponding sections of the cooperating V-shaped friction surface 21 of the casing A and correspondingly inclined thereto. On the inner side, that is, the side nearest the axis of the casing A, each shoe is provided with a lateral enlargement 25 on the front side of which is provided a rearwardly and inwardly inclined, longitudinally convex or crowned face 26 cooperating with one of the inclined faces 23 of the wedge block B. As shown clearly in Figure 3, the faces 23 of the wedge B and 24 of the shoes C are only slightly crowned or convex, being curved longitudinally on an arc of relatively great radius, for a purpose hereinafter described.

The spring resistance D, as shown, comprises an outer heavy coil 27 bearing at its inner end against the wall 20 of the casing A and an inner relatively lighter coil 28 bearing at its inner end on a hollow cuplike boss 29 formed integral with the end wall 20. At its forward end, the outer coil 27 of the spring bears directly on the inner ends of the shoes C—C—C. The inner coil 28 of the spring extends forwardly beyond the coil 27 and bears on the transverse shoulders 30—30—30 formed by the enlargements 25—25—25 of the shoes C—C—C.

The retainer bolt E is anchored at its rear end within the boss 29 and at its forward end within a suitable recess provided within the wedge B, the latter being apertured to accommodate the shank of the bolt. The bolt E not only serves to maintain the parts assembled but is also utilized to adjust the parts to proper overall length to maintain them in this position when under full release, and to place the spring under initial compression to compensate for wear.

In connection with my improved shock absorbing mechanism, assuming a compression action due to either a buffing or draft action of the drawbar, the general operation of the mechanism is as follows, detailed consideration of the cooperating convex or crowned inclined faces being omitted at this time: As the wedge B is forced inwardly of the casing, the shoes C—C—C will be forced rearwardly therewith against the resistance of the spring D and spread apart due to the wedging action between the cooperating wedge faces of the wedge B and the shoes, thereby forcing the shoes into intimate frictional contact with the friction surfaces of the casing A. High frictional resistance is thus produced between the casing A and the shoes C—C—C as they are forced inwardly of the latter, thereby effecting cushioning of the shocks to which the mechanism is subjected. Due to the inward taper of the friction shell section 18 of the casing A, a differential action will be set up between the shoes C—C—C and the wedge B, during compression of the mechanism, the shoes being advanced inwardly of the casing at a greater rate than the wedge, thereby augmenting the resistance to shocks offered by the mechanism.

Upon reduction of the actuating or compression force, the expansive action of the spring D effects release of the parts by forcing the shoes C—C—C and wedge B outwardly until further outward movement of the wedge is limited by the bolt E. The three shoes will be forced outwardly to their normal position limited by the wedge B as clearly shown in Figure 1.

Referring now more specifically to the operation and functioning of the convexed surfaces of the pressure transmitting wedge B and the shoes C—C—C: In commercial practice a variation of two degrees in the taper of the casing friction surfaces in a device of the kind disclosed is permitted. In carrying out my invention, the radius of curvature of each convex face 23 and the radius of curvature of each cooperating convex face 24 are made relatively long and of such a length that they will together accommodate variations within the two degrees hereinbefore referred to, that is, assuming the maximum variation in one direction, contact will be insured between the curved surface 23 and the curved surface 24 near the inner ends thereof; assuming the limit of variation in the opposite direction, contact will be assured between the curved surface 23 and the curved surface 24 near their outer ends; a casing formed with the friction surfaces tapered accurately as designed will insure contact at the centers of the curved surface 23 and curved surface 24; and variations intermediate the points referred to will insure contact between the extreme limits mentioned. The amount of crowning or curvature is preferably equally divided between the two cooperating surfaces 23 and 24, that is, the amount of curvature of each face is such that it will accommodate variations within one degree or one-half of the permissible variation of two degrees in taper of the casing friction surfaces. However, it will be evident that it is within the invention to vary the amount of crowning or curvature of each of the two curved surfaces, that is, that the crowning or curvature of one of said surfaces may be made greater than the other, so long as the total amount of crowning of the two cooperating surfaces or faces is such that it will accommodate the variation in two degrees of taper of the casing.

When the parts are assembled, there will be theoretically only a line contact between each set of surfaces 23 and 24, but as soon as the device is compressed once this theoretical line of contact will immediately be widened into a surface contact of appreciable width, and as two or three or four additional compressions of the mechanism occur, the area of contact is correspondingly increased or widened until a sufficiently large enough area is obtained to insure the proper functioning of the parts. This process of fitting the parts to compensate for permissible foundry variations can obviously be accomplished in the usual test of the gear before being shipped and applied to the car.

From the foregoing it will be observed that my improvements permit of automatic compensation of the parts even though the variation in inclination of one shell friction surface 21 may differ from the variation found in any other friction surface 21. It will also be evident that no increase in cost of manufacture of any of the parts, as compared with a device of similar type, is involved, and that the parts will automatically adjust themselves and produce the desired results as hereinbefore indicated.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction column having interior longitudinally extending inclined friction surfaces; of a spring resistance; friction shoes cooperating with said column, each shoe having on one side a friction surface in sliding engagement with one of said friction surfaces of the column, each shoe having on the opposite side thereof an inclined face slightly crowned in a direction lengthwise of the mechanism; and a member through which the actuating pressure is transmitted to said shoe and having a corresponding contacting face slightly crowned, whereby when the parts are initially assembled contact of relatively minute area is had between said faces to compensate for variations within predetermined limits, said crowned faces being flattened automatically upon actuations of the mechanism to thereby increase the area of contact of said surfaces and produce true contact therebetween.

2. In a friction shock absorbing mechanism, the combination with a friction casing having a plurality of interior, longitudinally extending, inwardly converging friction surfaces; of a spring resistance; a friction shoe cooperable with each casing friction surface, said shoe having on its inner side a face inclined inwardly and toward the center of the casing; and a member through which the actuating pressure is transmitted to said shoe and having a corresponding face, said faces being in contact with each other, said contacting faces each being slightly convex, the curvature of each of said convex faces being relatively small, whereby when the parts are initially assembled contact of relatively minute area is had between said faces to compensate for variations within predetermined limits, said convex faces being flattened automatically upon actuations of the mechanism to thereby increase the area of contact of said surfaces and produce true contact therebetween.

3. In a friction shock absorbing mechanism, the combination with a friction casing having interior friction surfaces; of a plurality of friction shoes within and cooperating with the friction surfaces of said casing; a spring resistance; and spreader means cooperable with said shoes, said means and shoes having coacting pairs of faces inclined to the axis of the mechanism, each of said coacting faces of each pair being slightly convex lengthwise of the mechanism.

4. In a friction shock absorbing mechanism, the combination with a friction casing having longitudinally extending friction surfaces; of a spring resistance; a friction shoe cooperating with each friction surface of the casing and having on one side a friction surface engaging said casing friction surface and on the opposite side a face inclined with respect to the line of applied force; and a wedge member through which the actuating force is transmitted to said shoes, said member having a plurality of faces, each face thereof contacting with the inclined face of one of said shoes, each of all of the contacting faces of said wedge and shoes having as initially made and assembled with the other parts of the mechanism, a slight crown adapted to bear on the crown of the coacting face, said crowns being adapted to flatten out after the parts have assumed a predetermined relative position to effect true surface contact thereof.

5. The herein described process of insuring proper fitting of the parts of a friction shock absorbing mechanism which includes a member having slightly converging interior walls, friction shoe elements cooperable therewith, and a member through which the actuating pressure is transmitted to the shoes, which includes: manufacturing said members and elements and providing on said shoe elements and walls of said first named member sets of engaging surfaces, and also sets of engaging surfaces on said shoe elements and member through which the pressure is transmitted, the sets of engaging surfaces of said elements and one of said members being crowned, assembling said members and elements with the remaining parts of the mechanism with said crowned portions in contact with each other; and then compressing the mechanism a number of times, thereby compressing said elements and members against each other to flatten out said crowns to provide a wider area of contact between said elements and the member having crowned surfaces.

6. The herein described process of insuring the accurate fitting of the parts of a friction shock absorbing mechanism comprising a friction casing having interior, inwardly converging friction surfaces; a spring resistance; a plurality of friction shoes cooperable with said friction surfaces; and a pressure transmitting wedge having wedging contact with said shoes, which includes: forming said casing, spring resistance, shoes, and wedge and initially providing interengaging convex faces on said wedge and shoes, said convex faces being of a contour of relatively small curvature; assembling said parts with the convex faces in contact with each other; and compressing the mechanism to press said convex faces against each other to thereby flatten down said faces to provide enlarged flat contacting areas between the shoes and wedge.

7. The herein described process of insuring proper fitting of the parts of a friction shock absorbing mechanism, including the following steps: forming a friction member having a friction surface thereon; forming a friction shoe element adapted to cooperate therewith; forming an element through which the actuating pressure is transmitted to the shoe; providing one of said elements with a surface having an elevated portion; providing the cooperating element with a surface having an elevated portion; assembling said member and elements with the remaining parts of the mechanism and with said elevated portions in contact with each other; and then compressing the mechanism a number of times thereby pressing said elevated portions together to flatten the same to provide a wider area of contact between said elements.

EDWARD H. LEHMAN.